United States Patent
Kang et al.

(10) Patent No.: US 12,170,687 B2
(45) Date of Patent: Dec. 17, 2024

(54) METHOD AND SYSTEM FOR DETERMINING SPAM URL

(71) Applicant: Kakao Corp., Jeju-si (KR)

(72) Inventors: Yun Chang Kang, Yongin-si (KR); Kwang Su Oh, Seongnam-si (KR); Seung Yun Jeong, Seoul (KR)

(73) Assignee: Kakao Corp., Jeju-si (KR)

( * ) Notice: Subject to any disclaimer, the term of this patent is extended or adjusted under 35 U.S.C. 154(b) by 554 days.

(21) Appl. No.: 17/473,546

(22) Filed: Sep. 13, 2021

(65) Prior Publication Data

US 2022/0086185 A1    Mar. 17, 2022

(30) Foreign Application Priority Data

Sep. 15, 2020   (KR) .................. 10-2020-0118625

(51) Int. Cl.
*H04L 9/40*      (2022.01)
*H04L 67/146*    (2022.01)

(52) U.S. Cl.
CPC ........ *H04L 63/1441* (2013.01); *H04L 67/146* (2013.01); *H04L 2463/146* (2013.01)

(58) Field of Classification Search
CPC ............... H04L 63/1441; H04L 67/146; H04L 2463/146; H04L 51/18; H04L 51/212;
(Continued)

(56) References Cited

U.S. PATENT DOCUMENTS 8,819,819 B1 * 8/2014 Johnston ................. H04L 67/02
                                                     709/224
8,862,675 B1 * 10/2014 Coomer ................ H04L 51/212
                                                     709/224
(Continued)

FOREIGN PATENT DOCUMENTS

JP    2005235206 A   9/2005
KR    10-86547 B1    11/2011
(Continued)

OTHER PUBLICATIONS

34. Thomas K, Grier C, Ma J, Paxson V, Song D. Design and evaluation of a real-time url spam filtering service. In2011 IEEE symposium on security and privacy May 22, 2011 (pp. 447-462). IEEE (Year: 2011).*

(Continued)

*Primary Examiner* — Catherine Thiaw
(74) *Attorney, Agent, or Firm* — NKL Law; Jae Youn Kim

(57) ABSTRACT

A method for determining a spam URL includes: (a) extracting a URL from an e-mail; (b) determining whether the extracted URL is a redirecting URL; (c) when the extracted URL is a redirecting URL, accessing a redirection URL that is connected as a result of access to the extracted URL; (d) when the redirection URL is a redirecting URL, accessing a redirection URL that is connected as a result of access to the redirection URL; (e) repeating operation (d); (f) when a last accessed URL in one of operations (c), (d), and (e) is not a redirecting URL, determine whether the last accessed URL is a spam URL; and (g) when it is determined that the last accessed URL is a spam URL, determining the extracted (Continued)

URL, the last accessed URL and any redirection URL connected between the extracted URL and the last accessed URL as spam URLs.

29 Claims, 10 Drawing Sheets

(58) Field of Classification Search
CPC ... H04L 63/1416; H04L 67/02; H04L 51/234; G06Q 50/60
See application file for complete search history.

(56) References Cited

U.S. PATENT DOCUMENTS

| | | | | |
|---|---|---|---|---|
| 8,966,582 | B1* | 2/2015 | Ainslie | H04L 63/14 726/22 |
| 8,984,640 | B1* | 3/2015 | Emigh | H04L 51/212 726/13 |
| 9,350,750 | B1* | 5/2016 | Aval | H04L 63/1425 |
| 9,667,575 | B1* | 5/2017 | Grzonkowski | H04L 51/212 |
| 9,781,149 | B1* | 10/2017 | Himler | H04L 63/1425 |
| 10,567,407 | B2* | 2/2020 | Tang | H04L 63/1425 |
| 10,616,274 | B1* | 4/2020 | Chang | G06F 16/9566 |
| 2005/0022031 | A1* | 1/2005 | Goodman | H04L 51/212 726/4 |
| 2008/0301139 | A1* | 12/2008 | Wang | G06F 16/9566 709/224 |
| 2009/0070872 | A1* | 3/2009 | Cowings | G06Q 10/107 726/23 |
| 2012/0166458 | A1* | 6/2012 | Laudanski | H04L 51/212 707/755 |
| 2015/0082451 | A1* | 3/2015 | Ciancio-Bunch | H04L 51/212 726/26 |
| 2020/0374313 | A1* | 11/2020 | Manoselvam | G06N 20/00 |
| 2021/0120013 | A1* | 4/2021 | Hines | G06N 3/045 |

FOREIGN PATENT DOCUMENTS

| | | |
|---|---|---|
| KR | 10-2013-0080831 A | 7/2013 |
| KR | 101907392 B1 | 10/2018 |
| KR | 10-2020-0034405 A | 3/2020 |

OTHER PUBLICATIONS

Kwon, Heeyoung, Mirza Basim Baig, and Leman Akoglu. "A domain-agnostic approach to spam-url detection via redirects." Advances in Knowledge Discovery and Data Mining: 21st Pacific-Asia Conference, PAKDD 2017, Jeju, South Korea, May 23-26, 2017, pp. 220-232, Springer International Pub (Year: 2017).*

* cited by examiner

METHOD AND SYSTEM FOR DETERMINING SPAM URL

CROSS-REFERENCE TO RELATED APPLICATIONS

This application claims priority to and the benefit of Korean patent application No. 10-2020-0118625 filed on Sep. 15, 2020, the disclosure of which is incorporated herein by reference in its entirety.

BACKGROUND OF THE DISCLOSURE

Field of the Disclosure

The present disclosure relates to a method and a system for determining a spam URL, and more particularly, to a method and system for, when an e-mail contains a spam URL, tracking the spam URL and determining any relevant redirection URL as spam.

Related Art

E-mail enables the transmission and reception of messages over a network and is currently mainly used on the Internet.

With the widespread of the Internet and mobile devices such as smart phones, users are able to access the Internet anytime and anywhere and the frequency of use and usability of e-mails are increasing remarkably. As a fast and effective means for exchanging information or communication, e-mails provide convenience to many people. However, due to such characteristics, there is a problem that a sender can send emails indiscriminately to an unspecified number of people even though the recipients do not want to receive the e-mails.

Spam e-mail are mostly used for publicity and advertisement and mainly used for illegal purposes. Currently, many e-mail service providers have introduced automatic spam block systems to block spam e-mails. However, as senders become increasingly sophisticated in sending spam e-mails, there is a limit to blocking all spam e-mails.

In particular, a method for modifying an original domain, for example, into a shortened URL and providing a redirecting link in order to make tracking the URL difficult is widely used in spam emails. The shorten URL shortens an original address, so it is easy to attach a link and a user can easily access the URL through various SNSs. In addition, the redirecting URL can be created in an almost unlimited number, so the URL is continuously modified and provided to a user while avoiding spam block systems.

Therefore, there is increasing need for a method for blocking various types of spam URLs. Specifically, it is necessary to develop a method and system for blocking and registering any redirecting URL and a final destination URL as spam so that it is possible to block such URLs even when a URL is modified in a redirecting process.

RELATED ART DOCUMENT

Patent Document

Korean Patent No. 1086547 B 1

SUMMARY

The present disclosure provides a method and system for determining a spam URL. Specifically, the present disclosure provides a method and system for extracting a URL from an e-mail to determine any URL redirected from the extracted URL as spam.

The present disclosure also provides a method and system for, when one URL is continuously redirected more than a predetermined number of times, determining all redirecting URLs, which have redirected a predetermined number of times, as spam.

The present disclosure also provides a method and system for determining whether a URL contained in an email is spam not only at a point in time when the email is received, but also various other points in time.

In an aspect, a method for determining a spam URL by a system for determining a spam URL includes: (a) extracting a URL from an e-mail; (b) determining whether the extracted URL is a redirecting URL by a predetermined method; (c) when the extracted URL is a redirecting URL, accessing a redirection URL that is connected as a result of access to the extracted URL; (d) when the redirection URL is a redirecting URL, accessing a redirection URL that is connected as a result of access to the redirection URL; (e) repeating operation (d); (f) when a last accessed URL in one of operations (c), (d), and (e) is not a redirecting URL, determine whether the last accessed URL is a spam URL; and (g) when it is determined in operation (f) that the last accessed URL is a spam URL, determining the extracted URL, the last accessed URL and any redirection URL connected between the extracted URL and the last accessed URL as spam URLs.

In operation (e), operation (d) may be performed a predetermined number of times or less. The method may further include (h) determining the extracted URL, the last accessed URL, and any redirection URL connected between the extracted URL and the last accessed URL as spam URLs when it is determined that the last accessed URL is a redirecting URL as a result of repeating operation (d) the predetermined number of times in operation (e).

The predetermined method may be to determine whether the extracted URL corresponds to any one of at least one predetermined form.

The at least one predetermined form may include any one of Shorten URL, FreeDomain URL, and PunyCode URL.

A URL may be accessed through a virtual browser in operations (c), (d) and (e).

In operation (f), a screenshot may be generated by accessing the last accessed URL and whether the last accessed URL is a spam URL may be determined based on the screenshot.

The determining of whether the last accessed URL is a spam URL based on the screenshot may be comparing the screenshot with a pre-registered spam image.

The screenshot and the pre-registered spam image may be compared to determine a similarity therebetween, and wherein the similarity may be compared with a preset value.

The similarity may be stored.

The method may further include (i) determining whether the extracted URL is a pre-registered spam URL.

Operation (i) may be performed prior to operation (b).

The method may further include (j) determining whether the redirection URL is a pre-registered spam URL.

The spam URL determined in operation (g) may be stored.

The spam URLs determined in operations (g) and (h) may be stored.

In another aspect, a system for determining a spam URL includes a URL extractor, a redirecting URL determiner, a URL access unit, a spam URL detector, and a spam URL determiner. The URL extractor may be configured to extract a URL from an e-mail. The redirecting URL determiner may be configured to determine whether the extracted URL is a redirecting URL by a predetermined method. The URL access unit may be configured to: (1) when the extracted URL is a redirecting URL, accessing a redirection URL connected as a result of access to the extracted URL; (2) when the redirection URL is a redirecting URL, accessing a redirection URL that is connected as a result of access to the redirection URL; and (3) repeat the access of operation (2). The spam URL detector may be configured to, when a last accessed URL in any one of operations (1), (2), and (3) is not a redirecting URL, determine whether the last accessed URL is a spam URL. The spam URL determiner may be configured to, when the spam URL detector determines that the last accessed URL is a spam URL, determine the extracted URL, the last accessed URL, and any redirection URL connected between the extracted URL and the last accessed URL as spam URLs.

The URL access unit may be further configured to repeat the access of operation (2) a predetermined number of times or less. The spam URL determiner may be further configured to, when it is determined the last accessed URL is a redirecting URL as a result of repeating the access of operation (2) the predetermined number of times or less, determine the extracted URL, the last accessed URL, and any redirection URL connected between the extracted URL and the last accessed URL as spam URLs.

The predetermined method may be to determine whether the extracted URL corresponds to any one of at least one predetermined form.

The at least one predetermined form may include any one of Shorten URL, FreeDomain URL, and PunyCode URL.

The URL access unit may be further configured to perform the access of operations (1), (2), and (3) through a virtual browser.

The spam URL detector may be further configured to generate a screenshot by accessing the last accessed URL and determine whether the last accessed URL is a spam URL based on the screenshot.

The system may further include a spam image data unit. The determining of whether the last accessed URL is a spam URL may be comparing the screenshot with a spam image pre-registered in the spam image data unit.

The screenshot and the pre-registered spam image may be compared to determine a similarity therebetween, and wherein the similarity may be compared with a preset value.

The system may further include a similarity storage. The similarity may be stored in the similarity storage.

The system may further include a spam URL data unit. The spam URL detector may be further configured to determine whether the extracted URL is a spam URL pre-registered in the spam URL data unit.

The determining of whether the extracted URL is a spam URL pre-registered in the spam URL data unit may be performed before the redirecting URL determiner determines whether the extracted URL is a redirecting URL by the predetermined method.

The system may further include a spam URL data unit. The spam URL detector may be further configured to determine whether the redirection URL is a spam URL pre-registered in the spam URL data unit.

The system may further include a spam URL data unit. When the spam URL determiner determines that the extracted URL, the last accessed URL, and any redirection URL connected between the extracted URL and the last accessed URL are spam URLs, the determined spam URLs may be stored in the spam URL data unit.

DESCRIPTION OF EXEMPLARY EMBODIMENTS

Figure 1:
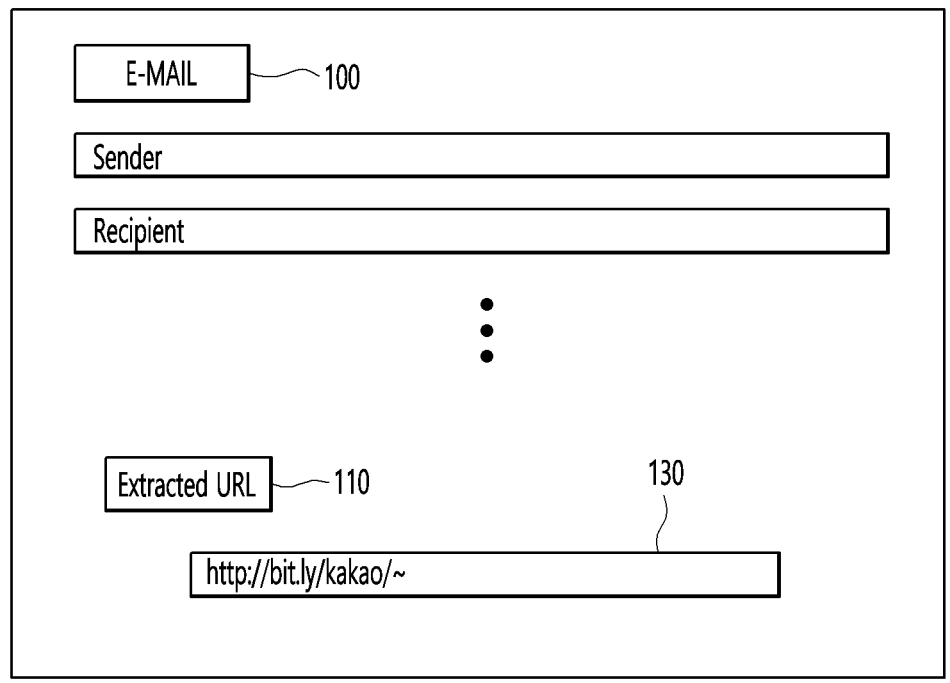
FIG. 1 is a diagram for explaining a type of a URL according to an embodiment of the present disclosure.
Figure 1:
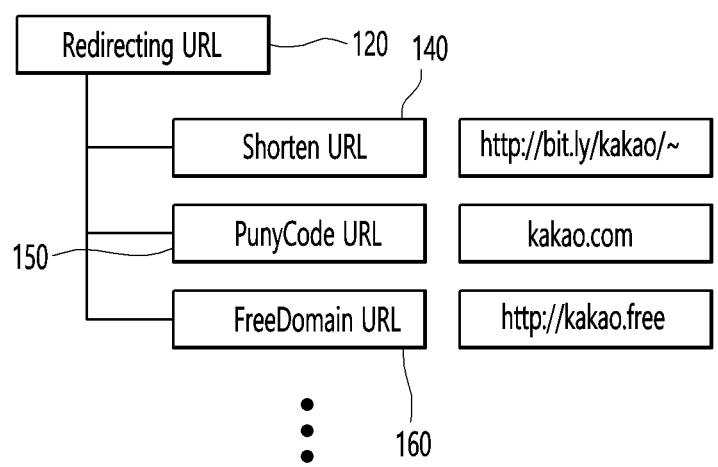

Hereinafter, exemplary embodiments of the present disclosure will be described in detail with reference to the accompanying drawings, wherein like reference numerals are used to designate identical or similar elements, and redundant description thereof will be omitted. The suffix "module" and "unit" of the components used in the following description are only given or mixed in consideration of ease of preparation of the description, and there is no meaning or role to be distinguished as it is from one another. Also, in the following description of the embodiments of the present disclosure, a detailed description of related prior arts will be omitted when it is determined that the gist of the embodiments disclosed herein may be obscured. Also, the accompanying drawings are included to provide a further understanding of the present disclosure, are incorporated in, and constitute a part of this specification, and it should be understood that the drawings are intended to cover all modifications, equivalents, or alternatives falling within the spirit and scope of the present disclosure.

Terms including ordinals, such as first, second, etc., may be used to describe various components, but the elements are not limited to these terms. The terms are used only for distinguishing one component from another.

When a component is referred to as being "connected" or "accessed" to another component, it may be directly connected or accessed to the other component, but it should be understood that other component may be present therebetween. When a component is referred to as being "directly connected" or "directly accessed" to another component, it should be understood that other component may not be present therebetween.

The terms of a singular form may include plural forms unless otherwise specified.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

In the present specification, a communication method of a network is not limited, and connection between components may not be connected in the same network method. The network may include not only a communication method using a communication network (e.g., a mobile communication network, a wired Internet, a wireless Internet, a broadcast network, a satellite network, etc.) but also short-range wireless communication between devices. For example, the network may include any communication method through which one object and another object may be connected, and is not limited to wired communication, wireless communication, 3G, 4G, 5G, or other methods. For example, a wired and/or wireless network may be a communication network according to one or more communication methods selected from a group including a Local Area Network (LAN), a Metropolitan Area Network (MAN), a Global System for Mobile Network (GSM), an Enhanced Data GSM Environment (EDGE), a High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over VoIP Internet Protocol), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), Wi-MAX (World Interoperability for Microwave Access), and ultrasonic-based communication, but not limited thereto.

Hereinafter, a method and system for determining a spam URL according to an embodiment of the present disclosure will be described with reference to the accompanying FIGS. 1 to 13.

The present disclosure relates to a method and system for tracking URLs included in an e-mail and determining any connected URL as spam.

FIG. 1 is a diagram for explaining a type of a URL according to an embodiment of the present disclosure.

Referring to FIG. 1, an e-mail 100 may contain a URL. In the present disclosure, a URL included in an e-mail is defined as an extracted URL 110. The extracted URL is generally provided in the form of a link to a recipient, and when the recipient clicks on the link, a page connected to the URL or another URL may be accessed. Alternatively, in another embodiment, the extracted URL may be provided in the form of a button, an image, or the like to the recipient. Specifically, when the recipient clicks on a push button or an image, a page connected to the URL or another URL may be accessed.

In addition, a redirecting URL 120 is defined in the present disclosure. Specifically, as described above, when the recipient clicks on a URL contained in the e-mail, a page connected to the URL or another URL connected to the URL may be accessed. When the another URL is accessed through the URL other than the page, the URL is defined as a redirecting URL.

The redirecting URL may be expressed in various forms. As an embodiment, the redirecting URL may be expressed in the form of a shorten URL (140, Shorten URL). The shorten URL is provided by shortening the length of an original URL, and is intended to be easily shown in an e-mail or various social network services (SNSs). Specifically, http://www.kakaocorp.com may be provided in the form a shorten URL such as http://bit.ly/kakao.

In another embodiment, the redirecting URL may be expressed in the form of PunyCode URL 150. PunyCode is an encoding to convert domain names in various languages. Specifically, http://www.kakaocorp.com may be provided in the form of a PunyCode URL in a non-English language, such as http://카카오.com.

In another embodiment, the redirecting URL may be expressed in the form of a FreeDomain URL 160. The FreeDomain URL is a method of providing a domain for free. Specifically, http://www.kakaocorp.com may be provided in the form of a FreeDomain URL such as http://kakao.free. The above-described embodiments are examples of general forms for explaining a redirecting URL, and the redirecting URL is not limited thereto and includes any form of URL that can be accessed through a URL other than a page.

Figure 2:
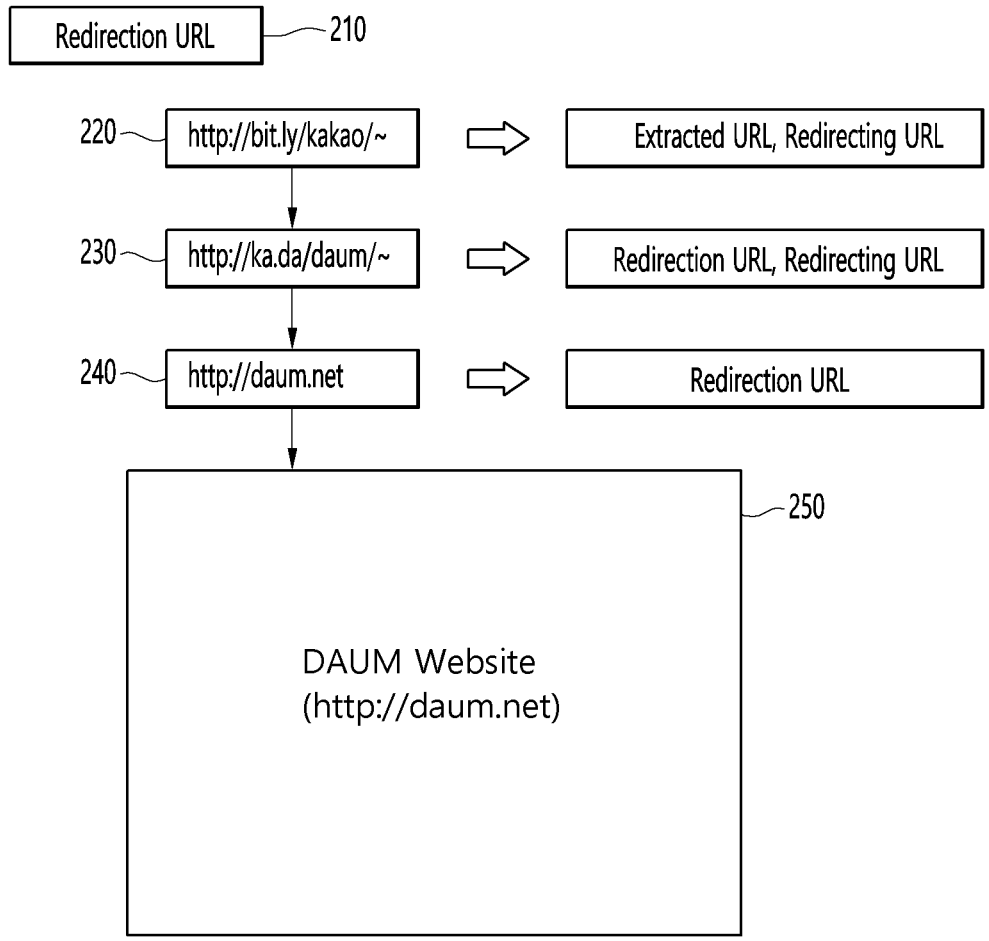
FIG. 2 is a diagram for explaining a type of a URL according to an embodiment of the present disclosure.

FIG. 2 is a diagram for explaining a type of a URL according to an embodiment of the present disclosure.

Referring to FIG. 2, the present disclosure defines a redirection URL 210 and describes the redirection URL by way of a specific example. The redirection URL 210 refers to a URL connected from the redirecting URL defined in FIG. 1. Specifically, referring to FIG. 1, a URL 220 may be a URL included in an e-mail. The URL 220 is defined as the extracted URL 110 in FIG. 1. The URL 220 may be an extracted URL and a redirecting URL that is connected to a URL other than a page. Therefore, it is possible to connect to another URL through the URL 220, and the URL connected in this way may be defined as the redirection URL 210.

In one embodiment, a URL 230 may be a redirection URL connected from URL 220 which is a redirecting URL. In addition, the URL 230 may be a redirecting URL that is connected to another URL.

In another embodiment, a URL 240 may be a redirection URL connected from URL 230 that is a redirecting URL. However, the URL 240 is a URL connected to a page, not to a redirecting URL that connects to another URL. It is the page 250 which is connected from the URL 240 rather than the redirecting URL.

Hereinafter, the present disclosure will be described with reference to the URLs defined in FIGS. 1 and 2.

Figure 3:
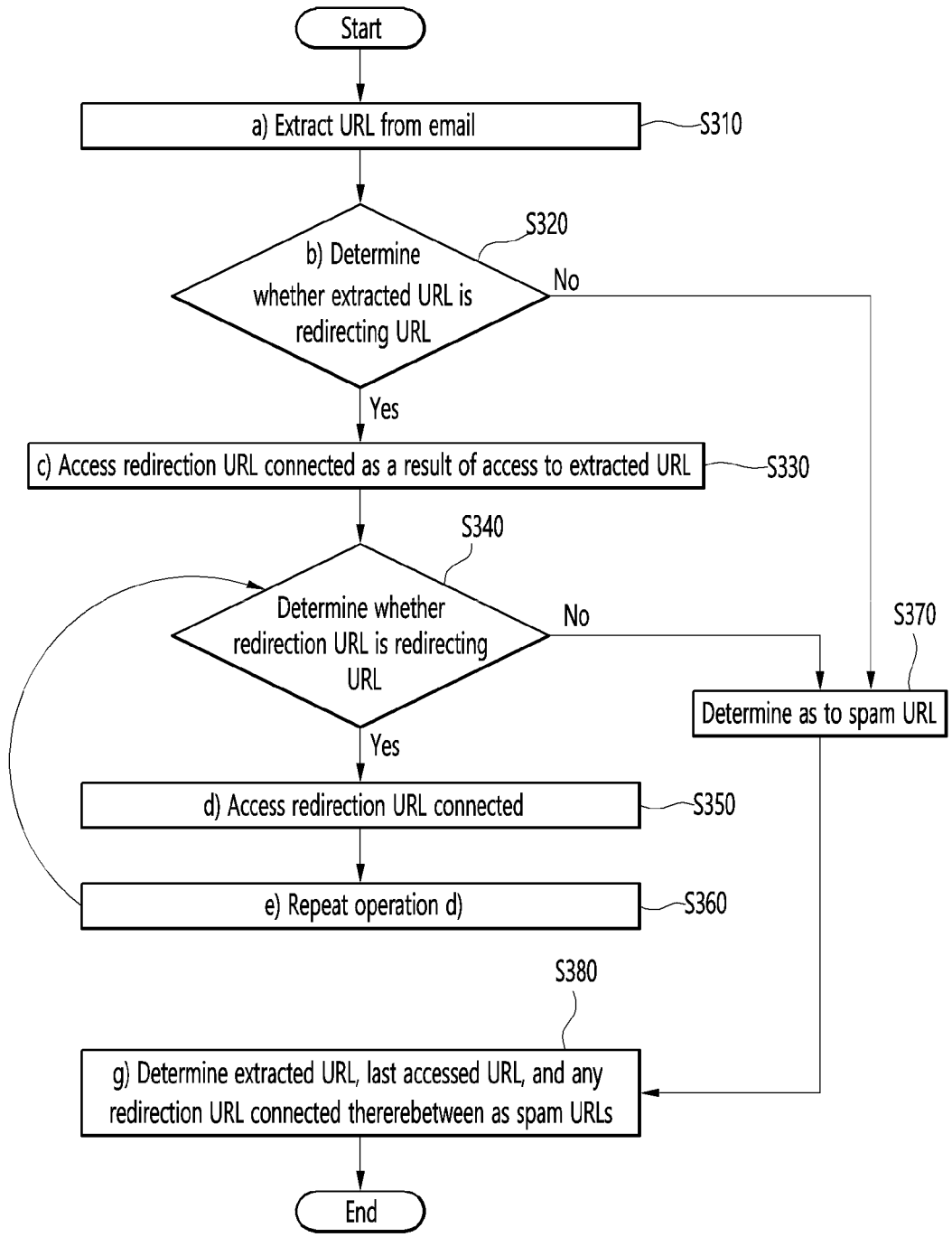
FIG. 3 is a flowchart of a method for determining a spam URL according to an embodiment of the present disclosure.

FIG. 3 is a flowchart of a method for determining a spam URL according to an embodiment of the present disclosure.

Referring to FIG. 3, a method of determining a spam URL according to the present disclosure may include operation S310 of extracting a URL from an e-mail, operation S320 of determining whether the extracted URL is a redirecting URL, operation S330 of accessing a redirection URL that is connected as a result of access to the extracted URL, operation S340 of determining whether the redirection URL is a redirecting URL, operation S350 of accessing the connected redirection URL, operation S360 of repeating operation S350, operation S370 of determining, whether the redirection URL is a spam URL in a case where it is determined in operation S340 that the redirection URL is not a redirecting URL, and operation S380 of determining the extracted URL, a last accessed URL, and any redirection URL connected therebetween as spam URLs.

Each of the above-described operations may be performed irrespective of the listed order, except for a case where the operations must be performed in the listed order due to a special cause-effect relation of the operations. However, hereinafter, for convenience of explanation, it is assumed that the above-described operations are performed in the listed order.

Hereinafter, operation S310 of extracting a URL from an e-mail will be described. Operation S310 of extracting the URL from the e-mail is an operation of extracting the URL contained in the e-mail by analyzing the e-mail.

URLs in various forms may be contained in e-mails. The URL may generally be in the form of a link. In another embodiment, the URL may be contained in the form of a button, an image, or the like in the e-mail. The URL may be included in the subject and body of the e-mail and may be included at another location as well. In operation S310, any URL contained in the e-mail is extracted, and it is determined whether the extracted URL is as a spam URL.

Hereinafter, operation S320 of determining whether the extracted URL is a redirecting URL will be described. As described above, a URL that enables access to another URL other than a page may be defined as a redirecting URL.

Specifically, it is determined whether the extracted URL in operation S310 is a redirecting URL. Such a determination may be made by various predetermined methods.

For example, whether the extracted URL is a redirecting URL may be determined by checking whether access to the extracted URL leads to connection to a page or connection to a redirection URL. However, in some cases, whether the extracted URL is a redirecting URL may be determined by a method other than the method of directly accessing the extracted URL as described above.

One of the predetermined methods may be, for example, determining whether the extracted URL corresponds to any one of at least one predetermined form. In detail, in a case where forms of the redirecting URL are pre-defined and the extracted URL is in any of the defined URL forms, the extracted URL may be determined as the redirecting URL. In an embodiment, at least one of the predefined forms may include any one of a Shorten URL, a FreeDomain URL, and a PunyCode URL. The present disclosure is not limited thereto, and it is obvious that a URL in various forms may be included. In addition, a method of checking whether access to the extracted URL leads to connection to a page or a redirection URL may also be included in a predetermined method.

In operation S320 of determining whether the extracted URL is a redirecting URL, when the extracted URL is not a redirecting URL, it may be determined whether the extracted URL is a spam URL. A detailed method of determining whether the extracted URL is a spam URL will be described later.

Hereinafter, operation S330 of accessing the redirection URL that is connected as a result of access to the extracted URL will be described.

In operation S320, it is determined whether the extracted URL is a redirecting URL, and when the extracted URL is a redirecting URL, a redirection URL corresponding to the redirecting URL must be accessed. The access to the redirection URL may be made by a system or by selection of an e-mail recipient, for example, by clicking on a URL link.

The access to the redirection URL by the system may be performed through a virtual browser. The virtual browser may include various commercial web browsers, and may be used to prevent a terminal or server from being infected with spam, viruses, and malicious codes when accessing a redirection URL. Access performed through the virtual browser is not limited to the access described in operation S330, but may include any access described in the present disclosure.

Hereinafter, operation S340 of determining whether the redirection URL is a redirecting URL will be described. A redirection URL corresponding to a redirecting URL may itself also be the redirecting URL. In this case, operation S340 may be performed according to the specific example described above in operation S320.

Hereinafter, operation S350 of accessing the connected redirection URL will be described. Since operation S350 may be performed according to the specific example described above in operation S330, a description of the same contents as those of the above-described example is omitted.

When the redirection URL is not a redirecting URL in operation S340, it may be determined whether the redirection URL is a spam URL. A method of determining whether the redirection URL is a spam URL in a case where the redirection URL is not a redirecting URL will be described later in detail.

Hereinafter, operation S360 of repeating operation S340 will be described.

When the redirection URL corresponding to a redirecting URL is another redirecting URL, the redirecting URL corresponding to the another redirecting URL may also be a redirecting URL. As described above, the URL extracted from the e-mail may continue to be connected to the redirecting URL. In this case, operation S340 is repeated.

When the redirection URL corresponding to a redirecting URL is not the redirecting URL, it may be determined whether the redirection URL is a spam URL, as described above. Conversely, when the extracted URL continues to be connected to the redirecting URL, it may cause a load on the server.

To this end, operation S340 may be repeated a predetermined number of times or less. This will be described with reference to FIG. 4.

Figure 4:
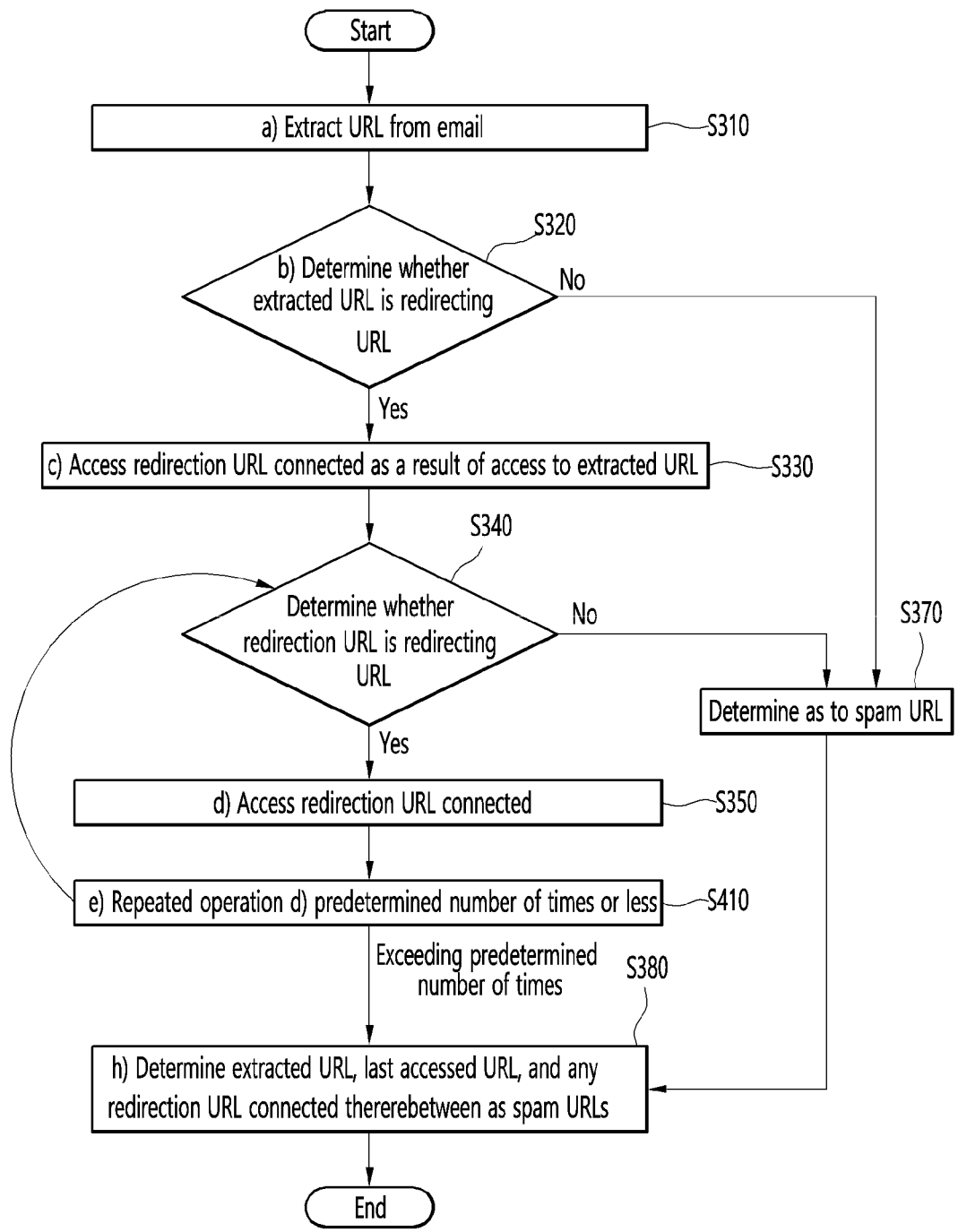
FIG. 4 is a flowchart of a method for determining a spam URL according to an embodiment of the present disclosure.

FIG. 4 is a flowchart of a method for determining a spam URL according to an embodiment of the present disclosure.

Referring to FIG. 4, it may include operation S410 of repeating operation S340 a predetermined number of times or less. In this case, when it is determined the redirection URL corresponding to the redirecting URL is not the redirecting URL as a result of operation S340 performed the predetermined number of times or less, it may be determined whether the redirecting URL is a spam URL. Conversely, when it is determined the redirection URL corresponding to the redirecting URL is the redirecting URL as a result of operation S340 repeated more than the predetermined number of times, operation S340 may be terminated and next operation S380 may be performed. Specifically, when the URL extracted from the e-mail continues to be connected to the redirecting URL more than the predetermined number of times, the extracted URL and any redirection URL connected from the extracted URL may be finally determined as spam without a spam URL determining process.

It is because when the redirecting URL is used for a normal purpose rather than spam, the number of times of redirecting is usually 1 or 2 times, and it is extremely rare that redirecting is performed more than 5 times, for example. Repeating operation S340 applies a load to the server. In order to prevent such a load, it is determined that the extracted URL is as spam without repeating operation S340 many times.

In one embodiment, in a case where the predetermined number of times is 5 and the URL extracted from the e-mail is connected only to the redirecting URL 5 times, the extracted URL and the redirecting URL connected 5 times may be all determined as spam.

Hereinafter, operation S370 of determining whether the redirection URL is a spam URL in a case where it is determined in operation S340 that the redirection URL is not a redirecting URL will be described.

Although operation S340 in the drawings is limited to a case where the redirection URL is not a redirecting URL, operation S370 may include even a case where the extracted URL is not a redirecting URL. Alternatively, operation S370 may include any operation of determining whether a URL is a spam URL.

Specific examples will be described with reference to FIGS. 5 and 6.

Figure 5:
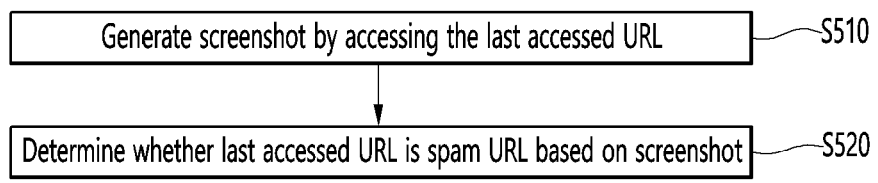
FIG. 5 is a diagram illustrating a specific example of a method for determining a spam URL according to an embodiment of the present disclosure.
Figure 6:
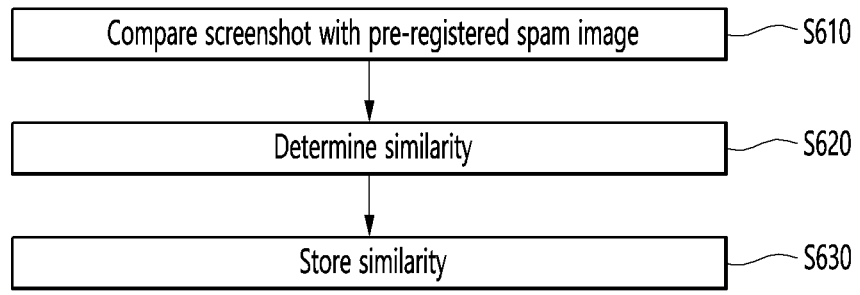
FIG. 6 is a diagram illustrating a specific example of a method for determining a spam URL according to an embodiment of the present disclosure.

FIGS. 5 and 6 are diagrams illustrating specific examples of a method for determining a spam URL according to an embodiment of the present disclosure.

In one example, although not shown in the drawings, an inspector may directly inspect a URL to determine whether the URL is a spam URL.

In another example, the determining of whether the URL is a spam URL may include generating a screenshot by accessing the last accessed URL in operation S510, and determining whether the last accessed URL is a spam URL based on the screenshot in operation S520. Specifically, the determining of whether the last accessed URL is a spam URL based on the screenshot may include comparing the screenshot with a pre-registered spam image in operation S610.

The generating the screenshot by accessing of the last accessed URL may be to analyze contents included in a page connected to the last accessed URL. In one example, the screenshot may be generated to analyze a page configuration of the page connected to the last accessed URL, contents included in the page, and the like.

Whether a URL is a spam URL may be determined by comparing the generated screenshot with the pre-registered spam image. In one example, when the pre-registered spam image is included in the generated screenshot, any redirection URLs related to a URL corresponding to the screenshot may be determined as a spam URL. In another example, when a specific image included in the generated screenshot is very similar to the pre-registered spam image, any redirection URL related to a URL corresponding to the screenshot may be determined as a spam URL. Specifically, the screenshot and the pre-registered spam image may be compared in operation S610, and a similarity therebetween may be determined in operation S620. The determining of the similarity may be performed through an image deep learning model. In one example, each image included in the screenshot may be analyzed through the image deep learning model and a similarity between a corresponding image and the pre-registered spam image may be determined by comparing the corresponding image with the pre-registered spam image. If there is an image with a similarity exceeding at least one preset similarity criterion among multiple images included in the screenshot, a URL corresponding to the screenshot may be determined as a spam URL. The method for determining a spam URL is not limited to the above-described examples and may be performed in various ways.

The similarity determined in operation S620 described above may be stored in operation S630. The stored similarity may be provided to an e-mail server, an e-mail recipient, an e-mail system operator, and the like. In one example, the e-mail system operator may be provided with the similarity and may directly determine a possibilty that an e-mail containing the URL is spam.

Hereinafter, operation S380 of determining the extracted URL, the last accessed URL, and any redirection URL connected therebetween as spam URLs will be described.

Any redirection URL appearing in the process of connecting from the extracted URL to the last accessed URL in the above-described operations may be determined as a spam URL. Then, when another e-mail includes a redirection URL determined as a spam URL, it is possible to immediately determine that the corresponding email is spam. Specifically, by blocking any redirecting URL and a final destination URL and registering such URLs as spam, it is possible to block the corresponding URLs as spam even if the URLs are modified in a redirecting process. In one example, in the redirecting process, the redirecting URL may be periodically modified to avoid a system for determining a spam URL. In this case, despite the modification of the redirecting URL, when a redirecting URL connected to the modified redirecting URL or a redirection URL connected from the modified redirecting URL is already determined as a spam URL, it is possible to block a user from accessing a final spam page. In addition, even the modified redirecting URL may be determined as a spam URL.

Figure 7:
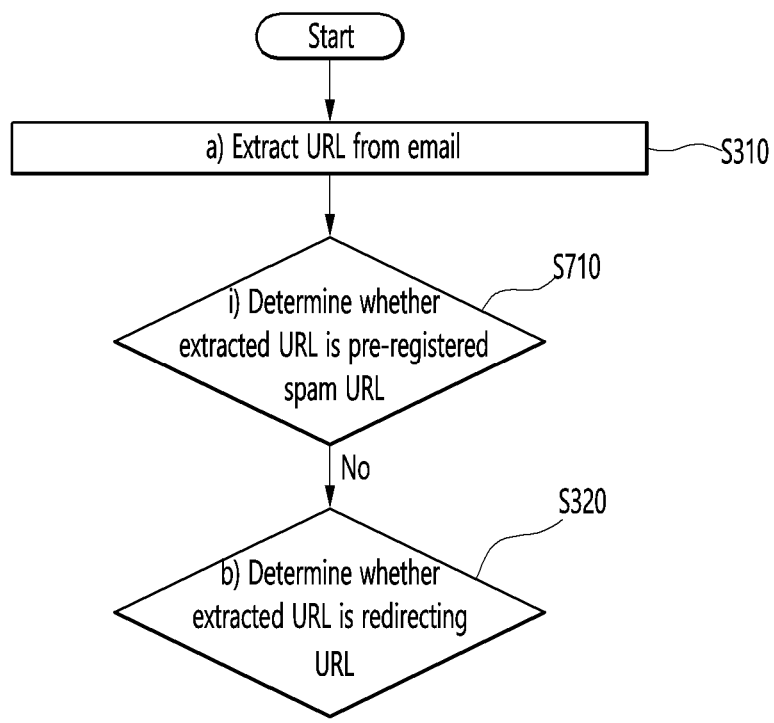
FIG. 7 is a diagram illustrating a specific example of a method for determining a spam URL according to an embodiment of the present disclosure.

FIG. 7 is a diagram illustrating a specific example of a method for determining a spam URL according to an embodiment of the present disclosure.

Referring to FIG. 7, the method may further include operation S710 of determining whether an extracted URL is a pre-registered spam URL. Also, operation S710 may be performed before operation S320 of determining whether the extracted URL is a redirecting URL. The determining of whether the extracted URL is a pre-registered spam URL may be performed in the same manner as in the above-described examples of operation S370.

The determining of whether the extracted URL is a pre-registered spam URL may be performed by comparing the extracted URL with the pre-registered spam URL. The pre-registered spam URL may be stored in a spam URL data unit which will be described later.

In addition, the determining of whether the extracted URL is a pre-registered spam URL may be performed by comparing with the extracted URL using an external spam DB. In the spam URL data unit, spam URLs determined according to the the present disclosure may be stored, or URLs determined as spam according to various methods that are not limited may be stored.

When the extracted URL is a spam URL, a tracking process may be omitted. Alternatively, even when the extracted URL is a spam URL, an e-mail recipient may be informed that the e-mail containing the extracted URL is spam, and the extracted URL may be tracked to determine any URL connected up to the last accessed URL as a spam URL according to the above-described operations.

Figure 8:
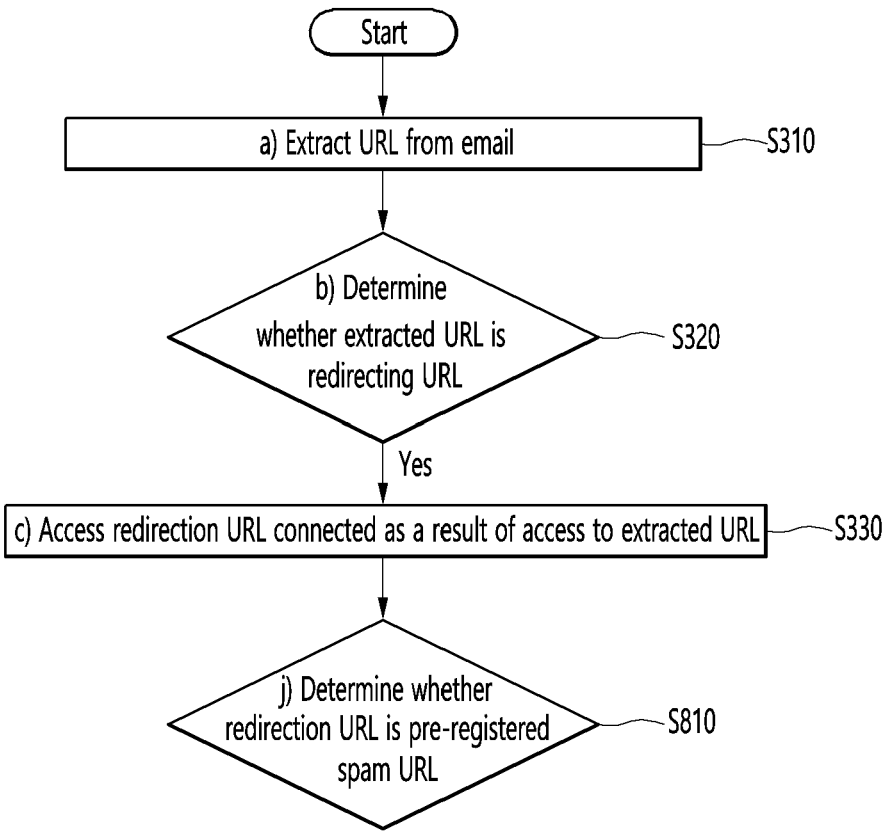
FIG. 8 is a diagram illustrating a specific example of a method for determining a spam URL according to an embodiment of the present disclosure.

FIG. 8 is a diagram illustrating a specific example of a method for determining a spam URL according to an embodiment of the present disclosure.

Referring to FIG. 8, the method for determining a spam URL may further include operation S810 of determining whether a redirection URL is a pre-registered spam URL. The determining of whether the redirection URL is a pre-registered spam URL may be performed in the same manner as in the above-described examples of operation S370. Alternatively, the determining of whether the redirection URL is a pre-registered spam URL may be performed by comparing the redirection URL with a pre-registered spam URL. Specifically, the determining of whether the redirection URL is a pre-registered spam URL may be performed in the same manner as the examples of the above-described operation S710.

Figure 9:
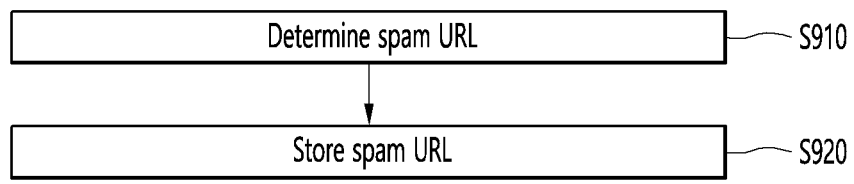
FIG. 9 is a diagram illustrating a specific example of a method for determining a spam URL according to an embodiment of the present disclosure.

FIG. 9 is a diagram illustrating a specific example of a method for determining a spam URL according to an embodiment of the present disclosure.

Referring to FIG. 9, when a spam URL is determined in operation S910 through the above-described operations, the spam URL may be stored in operation S920. The spam URL may be stored in a spam URL data unit which will be described later. Alternatively, an external spam DB may be connected to store the spam URL. Spam URLs stored through operation S920 may be utilized as pre-registered spam URLs in operations S710 and S810.

Figure 10:
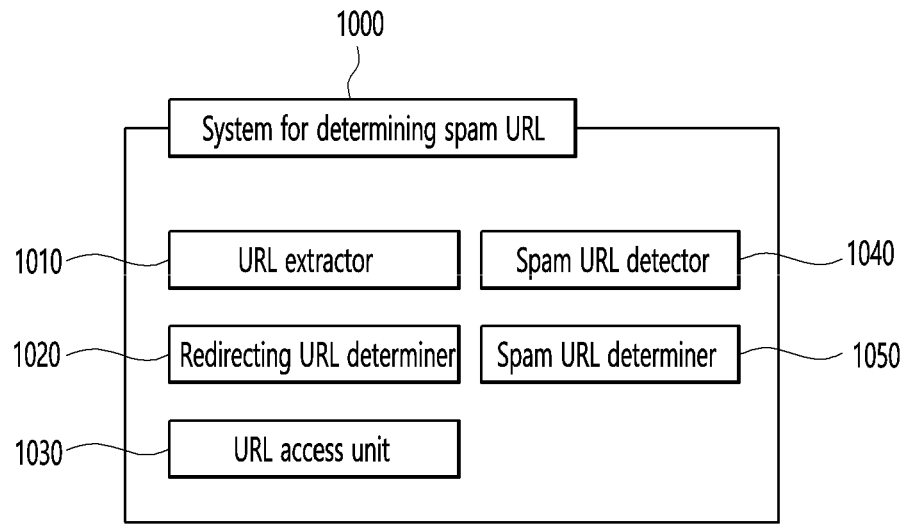
FIG. 10 is a diagram illustrating a system for determining a spam URL according to an embodiment of the present disclosure.

FIG. 10 is a diagram illustrating a system for determining a spam URL according to an embodiment of the present disclosure.

Referring to FIG. 10, a system 1000 for determining a spam URL may include a URL extractor 1010, a redirecting URL determiner 1020, a URL access unit 1030, a spam URL detector 1040, and a spam URL determiner 1050.

The URL extractor 1010 may extract a URL from an e-mail. An example of a method of extracting a URL from an e-mail has been described above in operation S310.

The redirecting URL determiner 1020 may determine whether the extracted URL is a redirecting URL by a predetermined method. An example of a method of determining whether the extracted URL is a redirecting URL by a predetermined method has been described above in operation S320.

When the extracted URL is a redirecting URL, the URL access unit 1030 may connect to a redirection URL connected as a result of access to the extracted URL. When the redirection URL is a redirecting URL, the URL access unit 1030 may access a redirection URL connected as a result of access to the redirection URL and repeat the access to the redirection URL. The example of the access operation has been described above in operations S330, S350, and S360.

The spam URL detector 1040 may determine whether the last accessed URL is a spam URL in a case where the last accessed URL in any one access made through the URL access unit is not a redirecting URL. An example of a method of determining whether the last accessed URL is a spam URL has been described above in operation S370.

When the spam URL detector determines a spam URL, the spam URL determiner 1050 may determine the extracted URL, the last accessed URL, and any redirection URL connected between the extracted URL and the last accessed URL as spam URLs. An example of a method of determining the extracted URL, the last accessed URL, and any redirection URL connected between the extracted URL and the last accessed URL as spam URLs has been described above in operation S380.

Figure 11:
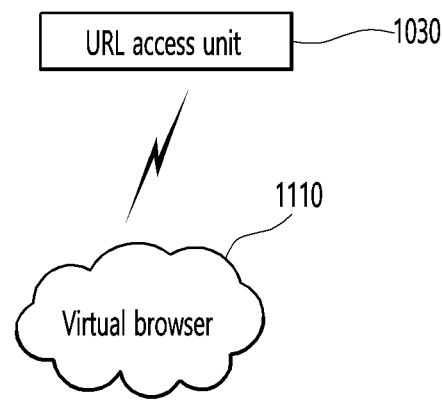
FIG. 11 is a diagram illustrating a specific example of a system for determining a spam URL according to an embodiment of the present disclosure.

FIG. 11 is a diagram illustrating a specific example of a system for determining a spam URL according to an embodiment of the present disclosure.

Referring to FIG. 11, when the extracted URL is a redirecting URL, the URL access unit 1030 may access a redirection URL connected as a result of access to the extracted URL. Then, when the redirection URL is a redirecting URL, the URL access unit 1030 may access a redirection URL connected as a result of the access to the redirection URL and may repeat the access to the redirection URL through the virtual browser 1110. An example of performing access through the virtual browser 1110 has been described above in operation S330.

Figure 12:
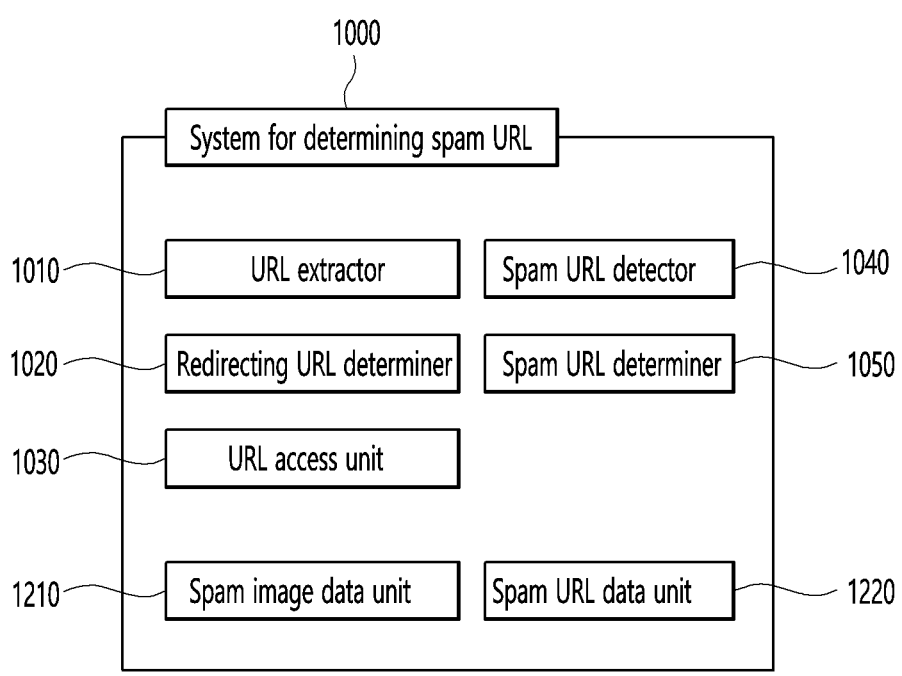
FIG. 12 is a diagram illustrating a specific example of a system for determining a spam URL according to an embodiment of the present disclosure.

FIG. 12 is a diagram illustrating a specific example of a system for determining a spam URL according to an embodiment of the present disclosure.

Referring to FIG. 12, a system 1000 for determining a spam URL may further include a spam image data unit 1210 and a spam URL data unit 1220.

The spam image data unit 1210 may store a pre-registered spam image, and the system 1000 may determine a spam URL by comparing a screenshot and a spam image pre-registered in the spam image data unit. A method of determining a spam URL by comparing with the pre-registered spam image has been described above in operations S520 and S610.

Although not illustrated in the drawing, the system 1000 may further include a similarity storage. The similarity storage may store a similarity determined by comparing the screenshot and the pre-registered spam image. A method of determining and storing a similarity has been described above in operations S620 and S630.

The spam URL data unit 1220 may store the pre-registered spam URL, and the system 1000 may determine a spam URL by comparing an extracted URL or redirection URL with the spam URL pre-registered in the spam URL data unit. A method of determining a spam URL by comparing with the pre-registered spam URL has been described above in operations S710 and S810.

Figure 13:
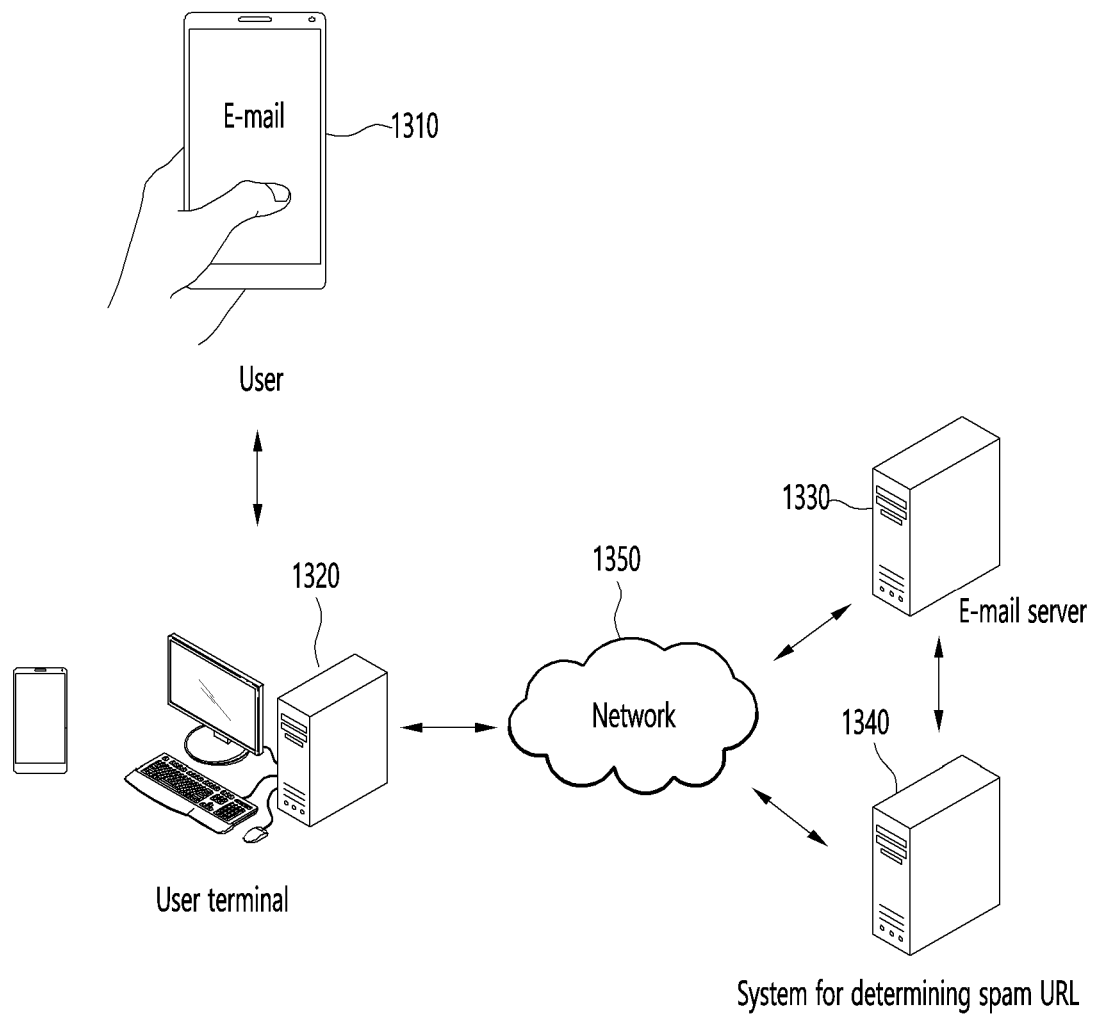
FIG. 13 is a diagram illustrating a time point at which a spam URL is determined according to an embodiment of the present disclosure.

FIG. 13 is a diagram illustrating a time point at which a spam URL is determined according to an embodiment of the present disclosure.

Referring to FIG. 13, a user terminal 1320, an e-mail server 1330, and a system 1340 for determining a spam URL may be connected via a network 1350.

A method for determining a spam URL by a system for determining a spam URL may be performed at a point in time when a user receives an e-mail, a point in time when the e-mail is opened, and a point in time when the user is reading the e-mail. In addition, the present disclosure is not limited thereto and may be performed at various points in time.

Specifically, the method for determining a spam URL may be performed at a point when an e-mail is recorded in the e-mail server via the network, a point in time when the e-mail server sends the e-mail to the user terminal via the network, and a point in time when the user terminal requests the e-mail server to receive the e-mail via the network, etc.

The effects of the method and system for determining a spam URL according to an embodiment of the present disclosure will be described as follows.

The method and system for determining a spam URL block any redirecting URL and a final destination URL and registers such URLs as spam, and thus, it is possible to block the URLs even when the URL is modified in a redirecting process.

In addition, in the method and system for determining spam URLs according to an embodiment of the present disclosure, when one URL continues to be redirected more than a predetermined number of times, any redirecting URLs which has been redirected up to the predetermined number of times may be determined as spam, thereby reducing a load to the server and quickly responding to a spam URL.

The technical features disclosed in each embodiment of the present disclosure are not limited to the embodiment, and unless they are mutually incompatible, the technical features disclosed in each embodiment may be combined and applied to different embodiments.

In the above, embodiments of the method and system for determining the spam URL of the present disclosure have been described. The present disclosure is not limited to the above-described embodiments and the accompanying drawings, and it is to be understood that various equivalent modifications and variations of the embodiments can be made by a person having an ordinary skill in the art without departing from the spirit and scope of the present disclosure. Therefore, the scope of the present disclosure should be defined by the appended claims and equivalents thereof.

The present disclosure may be implemented as a computer-readable code (application or software) in a program-recorded medium. The above-described generating method of the autonomous vehicle may be realized by a coded stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). In addition, the computer may include a processor or a controller. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

What is claimed is:

1. A method for determining a spam URL by a system for determining the spam URL, the method comprising:
   (a) extracting a URL from an e-mail;
   (b) determining whether the extracted URL is a redirecting URL by a predetermined method;
   (c) when the extracted URL is the redirecting URL, accessing a redirection URL that is connected as a result of access to the extracted URL;
   (d) when the redirection URL is the redirecting URL, accessing a subsequent redirection URL that is connected as a result of access to the redirection URL;
   (e) repeating operation (d);
   (f) when a last accessed URL in one of operations (c), (d), and (e) is not the redirecting URL, determine whether the last accessed URL is a spam URL; and
   (g) when it is determined in operation (f) that the last accessed URL is the spam URL, determining the extracted URL, the last accessed URL, the redirection URL and the subsequent redirection URL connected between the extracted URL and the last accessed URL as spam URLs,
   wherein, in operation (e), operation (d) is performed a predetermined number of times, and wherein, the method further comprises, when a number of connections to the subsequent redirection URL exceeds the predetermined number of times, stopping operation (d) and classifying the extracted URL, the redirection URL and the subsequent redirection URL, as the spam URLs.

2. The method of claim 1,
   wherein the method further comprises (h) determining the extracted URL, the last accessed URL, and the redirection URL and the subsequent redirection URL connected between the extracted URL and the last accessed URL as the spam URLs when it is determined that the last accessed URL is the redirecting URL as a result of repeating operation (d) the predetermined number of times in operation (e).

3. The method of claim 2,
   wherein the spam URLs determined in operations (g) and (h) are stored.

4. The method of claim 1,
   wherein the predetermined method is to determine whether the extracted URL corresponds to any one of at least one predetermined form.

5. The method of claim 4,
   wherein the at least one predetermined form comprises any one of Shorten URL, FreeDomain URL, and PunyCode URL.

6. The method of claim 1,
   wherein the URL is accessed through a virtual browser in operations (c), (d) and (e).

7. The method of claim 1,
   wherein, in operation (f), a screenshot is generated by accessing the last accessed URL and whether the last accessed URL is the spam URL is determined based on the screenshot.

8. The method of claim 7,
   wherein the determining of whether the last accessed URL is the spam URL based on the screenshot is comparing the screenshot with a pre-registered spam image.

9. The method of claim 8,
   wherein the screenshot and the pre-registered spam image are compared to determine a similarity therebetween, and
   wherein the similarity is compared with a preset value.

10. The method of claim 9,
    wherein the similarity is stored.

11. The method of claim 1, further comprising:
    (i) determining whether the extracted URL is a pre-registered spam URL.

12. The method of claim 11,
    wherein operation (i) is performed prior to operation (b).

13. The method of claim 1, further comprising:
    (j) determining whether the redirection URL is a pre-registered spam URL.

14. The method of claim 1,
    wherein the spam URL determined in operation (g) is stored.

15. The method of claim 1,
    wherein the method for determining the spam URL is performed at any one of a point in time when the e-mail is received and a point in time when the e-mail is opened.

16. A system for determining a spam URL, comprising:
    a processor;
    a memory storing instructions executable by the processor, the stored instructions in the memory, which, when executed by the processor, facilitate the following operations:
    extracting a URL from an e-mail;
    determining whether the extracted URL is a redirecting URL based on a predetermined method;
    accessing the extracted URL, which includes:
    (1) when the extracted URL is the redirecting URL, accessing a redirection URL connected as a result of access to the extracted URL;

(2) when the redirection URL is the redirecting URL, accessing a subsequent redirection URL that is connected as a result of access to the redirection URL; and (3) repeating operation (2);

detecting spam URLs by determining if a last accessed URL in any one of operations (1), (2), and (3) is not the redirecting URL; and determining the extracted URL, the last accessed URL, the redirection URL and the subsequent redirection URL connected between the extracted URL and the last accessed URL as spam URLs if the last accessed URL is detected as the spam URL;

repeating operation (2) a predetermined number of times; and if a number of connections to the subsequent redirection URL exceeds the predetermined number of times, stopping operation (2) and classifying the extracted URL, the redirection URL and the subsequent URL as the spam URLs.

17. The system of claim 16, wherein in the determining of the extracted URL, when it is determined the last accessed URL is the redirecting URL as a result of repeating operation (2) the predetermined number of times or less, the extracted URL, the last accessed URL, the redirection URL and the subsequent redirection URL connected between the extracted URL and the last accessed URL are determined as the spam URLs.

18. The system of claim 16, wherein the predetermined method is to determine whether the extracted URL corresponds to any one of at least one predetermined form.

19. The system of claim 18, wherein the at least one predetermined form comprises any one of Shorten URL, FreeDomain URL, and PunyCode URL.

20. The system of claim 16, wherein when accessing the URL, the access of operations (1), (2), and (3) are performed through a virtual browser.

21. The system of claim 16, wherein, when the instructions stored in the memory are executed by the processor, the stored instructions further facilitate the following operation:

generating a screenshot by accessing the last accessed URL; and determining whether the last accessed URL is the spam URL based on the screenshot.

22. The system of claim 21, wherein, when the instructions stored in the memory are executed by the processor, the stored instructions further facilitate the following operation:

comparing the screenshot with a pre-registered spam image to determine whether the last accessed URL is the spam URL.

23. The system of claim 22, wherein the screenshot and the pre-registered spam image are compared to determine a similarity therebetween, and wherein the similarity is compared with a preset value.

24. The system of claim 23, further comprising:

a similarity storage, wherein the similarity is stored in the similarity storage.

25. The system of claim 16, wherein, when the instructions stored in the memory are executed by the processor, the stored instructions further facilitate the following operation:

determining whether the extracted URL is a pre-registered spam URL.

26. The system of claim 25, wherein the determining of whether the extracted URL is the pre-registered spam URL is performed before determining whether the extracted URL is the redirecting URL by the predetermined method.

27. The system of claim 16, wherein, when the instructions stored in the memory are executed by the processor, the stored instructions further facilitate the following operation:

determining whether the redirection URL is a pre-registered spam URL.

28. The system of claim 16, wherein, when the instructions stored in the memory are executed by the processor, the stored instructions further facilitate the following operation:

determining that the extracted URL, the last accessed URL, the redirection URL and the subsequent redirection URL connected between the extracted URL and the last accessed URL are the spam URLs, wherein the determined spam URLs are stored.

29. The system of claim 16, wherein a method for determining the spam URL by the system for determining the spam URL is performed at any one of a point in time when the e-mail is received and a point in time when the e-mail is opened.

* * * * *